United States Patent
Keith, Jr.

(10) Patent No.: US 8,175,418 B1
(45) Date of Patent: May 8, 2012

(54) METHOD OF AND SYSTEM FOR ENHANCED DATA STORAGE

(75) Inventor: Robert O. Keith, Jr., Modesto, CA (US)

(73) Assignee: MAXSP Corporation, Sunnyvale, CA (US)

( * ) Notice: Subject to any disclaimer, the term of this patent is extended or adjusted under 35 U.S.C. 154(b) by 1169 days.

(21) Appl. No.: 11/977,884

(22) Filed: Oct. 26, 2007

(51) Int. Cl.
*G06K 9/00* (2006.01)

(52) U.S. Cl. .................... 382/305; 711/162; 382/166

(58) Field of Classification Search .................. 711/162; 382/166, 305
See application file for complete search history.

(56) References Cited

U.S. PATENT DOCUMENTS

| | | | |
|---|---|---|---|
| 4,866,635 A | 9/1989 | Kahn et al. | 364/513 |
| 5,602,990 A | 2/1997 | Leete | 395/183.22 |
| 5,649,196 A | 7/1997 | Woodhill et al. | 395/620 |
| 5,659,743 A | 8/1997 | Adams et al. | 395/621 |
| 5,787,409 A | 7/1998 | Seiffert et al. | |
| 5,802,364 A | 9/1998 | Senator et al. | |
| 5,812,751 A | 9/1998 | Ekrot et al. | |
| 5,835,911 A | 11/1998 | Nakagawa et al. | |
| 5,897,635 A | 4/1999 | Torres et al. | |
| 5,933,647 A | 8/1999 | Aronberg et al. | |
| 5,950,010 A | 9/1999 | Hesse et al. | |
| 5,974,547 A | 10/1999 | Klimenko | 713/2 |
| 6,012,152 A | 1/2000 | Douik et al. | 714/26 |
| 6,029,196 A | 2/2000 | Lenz | 709/221 |
| 6,067,582 A | 5/2000 | Smith et al. | |
| 6,144,959 A | 11/2000 | Anderson et al. | |
| 6,170,065 B1 | 1/2001 | Kobata et al. | 714/7 |
| 6,189,101 B1 | 2/2001 | Dusenbury, Jr. | |
| 6,209,089 B1 | 3/2001 | Selitrennikoff et al. | 713/2 |
| 6,212,660 B1 | 4/2001 | Joeressen et al. | 714/758 |
| 6,282,711 B1 | 8/2001 | Halpern et al. | |
| 6,301,612 B1 | 10/2001 | Selitrennikoff et al. | 709/220 |
| 6,317,761 B1 | 11/2001 | Landsman et al. | 707/513 |
| 6,349,137 B1 | 2/2002 | Hunt et al. | |
| 6,356,915 B1 | 3/2002 | Chtchetkine et al. | 707/200 |
| 6,363,400 B1 | 3/2002 | Chtchetkine et al. | 707/200 |
| 6,366,296 B1 | 4/2002 | Boreczky et al. | 345/719 |
| 6,378,035 B1 | 4/2002 | Parry et al. | 711/110 |
| 6,421,777 B1 | 7/2002 | Pierre-Louis et al. | 713/2 |
| 6,449,658 B1 | 9/2002 | Lafe et al. | 709/247 |
| 6,459,499 B1 | 10/2002 | Tomat | |
| 6,463,530 B1 | 10/2002 | Sposato | 713/2 |
| 6,473,794 B1 | 10/2002 | Guheen et al. | 709/223 |
| 6,477,531 B1 | 11/2002 | Sullivan et al. | |

(Continued)

OTHER PUBLICATIONS

Muthitacharoen et al., "A Low-bandwidth Network File System," MIT Laboratory for Computer Science and NYU Department of Computer Science, 2001, 14 pages.

(Continued)

*Primary Examiner* — Jasmine Song

(74) *Attorney, Agent, or Firm* — Haverstock & Owens LLP

(57) ABSTRACT

A method of and system for enhanced storage allows more data to be backed up than would otherwise be possible. Instead of storing uncompressed base images and incremental images, differentials of non-current base images are compressed and stored. Furthermore, incremental images that are older than the current base image are removed. By only saving differential base images that are compressed, aside from the newest base image, and deleting older incremental images, a significant amount of space is saved. A removable drive is used as temporary storage in the process of generating a compressed differential base for previous base images. Additionally, a process ensures that previous base images are differentials of the most recent base image and not each other.

25 Claims, 6 Drawing Sheets

Standard Backup: Base Image, Incremental Images, Base Image, Base Image

Base Image Compression: Delta Image, Incremental Images, Base Image

U.S. PATENT DOCUMENTS

| | | |
|---|---|---|
| 6,490,677 B1 | 12/2002 | Aguilar et al. .................. 713/1 |
| 6,536,037 B1 | 3/2003 | Guheen et al. ............... 717/151 |
| 6,553,375 B1 | 4/2003 | Huang et al. |
| 6,556,950 B1 | 4/2003 | Schwenke et al. ........... 702/183 |
| 6,606,744 B1 | 8/2003 | Mikurak ..................... 717/174 |
| 6,625,651 B1 | 9/2003 | Swartz et al. |
| 6,625,754 B1 | 9/2003 | Aguilar et al. |
| 6,636,857 B2 | 10/2003 | Thomas et al. ................ 707/10 |
| 6,654,797 B1 | 11/2003 | Kamper ....................... 709/220 |
| 6,654,801 B2 | 11/2003 | Mann et al. |
| 6,694,375 B1 | 2/2004 | Beddus et al. ............... 709/249 |
| 6,697,852 B1 | 2/2004 | Ryu |
| 6,704,886 B1 | 3/2004 | Gill et al. |
| 6,718,464 B2 | 4/2004 | Cromer et al. .................. 713/2 |
| 6,728,530 B1 | 4/2004 | Heinonen et al. |
| 6,735,625 B1 | 5/2004 | Ponna .......................... 709/223 |
| 6,751,658 B1 | 6/2004 | Haun et al. ................... 709/222 |
| 6,757,729 B1 | 6/2004 | Devarakonda et al. |
| 6,816,462 B1 | 11/2004 | Booth, III et al. ............ 370/248 |
| 6,816,882 B1 | 11/2004 | Conner et al. |
| 6,871,210 B1 | 3/2005 | Subramanian ............... 709/203 |
| 6,880,108 B1 | 4/2005 | Gusler et al. |
| 6,885,481 B1 | 4/2005 | Dawe |
| 6,886,020 B1 | 4/2005 | Zahavi et al. ................ 707/204 |
| 6,915,343 B1 | 7/2005 | Brewer et al. ................ 709/224 |
| 6,954,853 B2 | 10/2005 | Wang et al. |
| 6,954,930 B2 | 10/2005 | Drake et al. |
| 6,959,235 B1 | 10/2005 | Abdel-Malek et al. |
| 6,985,967 B1 | 1/2006 | Hipp |
| 7,003,560 B1 | 2/2006 | Mullen et al. |
| 7,003,663 B2 | 2/2006 | Lagosanto et al. |
| 7,058,698 B2 | 6/2006 | Chatterjee et al. |
| 7,080,118 B2 | 7/2006 | Hildebrand |
| 7,143,307 B1 | 11/2006 | Witte et al. |
| 7,149,698 B2 | 12/2006 | Guheen et al. |
| 7,175,078 B2 | 2/2007 | Ban et al. |
| 7,178,166 B1 | 2/2007 | Taylor et al. |
| 7,194,445 B2 | 3/2007 | Chan et al. |
| 7,200,779 B1 | 4/2007 | Coss, Jr. et al. |
| 7,210,143 B2 | 4/2007 | Or et al. |
| 7,237,122 B2 | 6/2007 | Kadam et al. |
| 7,287,053 B2 | 10/2007 | Bodin |
| 7,328,367 B2 | 2/2008 | Ukai et al. |
| 7,337,311 B2 | 2/2008 | Chen et al. |
| 7,392,046 B2 | 6/2008 | Leib et al. |
| 7,401,125 B1 | 7/2008 | Uchida et al. |
| 7,480,822 B1 | 1/2009 | Arbon et al. |
| 7,512,584 B2 | 3/2009 | Keith, Jr. |
| 7,571,467 B1 | 8/2009 | Priestley et al. |
| 7,627,694 B2 | 12/2009 | Sreenivasan et al. |
| 7,698,487 B2 | 4/2010 | Rothman et al. |
| 7,788,524 B2 | 8/2010 | Wing et al. |
| 2001/0037323 A1 | 11/2001 | Moulton et al. .................. 707/1 |
| 2001/0049793 A1 | 12/2001 | Sugimoto .................... 713/200 |
| 2002/0013827 A1 | 1/2002 | Edstrom et al. |
| 2002/0035674 A1 | 3/2002 | Vetrivelkumaran et al. |
| 2002/0049764 A1 | 4/2002 | Boothby et al. ............. 707/100 |
| 2002/0083183 A1 | 6/2002 | Pujare et al. |
| 2002/0087625 A1 | 7/2002 | Toll et al. |
| 2002/0087963 A1 | 7/2002 | Eylon et al. |
| 2002/0091763 A1 | 7/2002 | Shah et al. |
| 2002/0094868 A1 | 7/2002 | Tuck et al. |
| 2002/0104080 A1 | 8/2002 | Woodard et al. |
| 2002/0107920 A1 | 8/2002 | Hotti |
| 2002/0116585 A1 | 8/2002 | Scherr .......................... 711/133 |
| 2002/0124092 A1 | 9/2002 | Urien ........................... 709/229 |
| 2002/0138640 A1 | 9/2002 | Raz et al. |
| 2002/0157089 A1 | 10/2002 | Patel et al. |
| 2002/0161868 A1 | 10/2002 | Paul et al. .................... 709/221 |
| 2002/0188941 A1 | 12/2002 | Cicciarelli et al. |
| 2003/0005096 A1 | 1/2003 | Paul et al. .................... 709/222 |
| 2003/0033379 A1 | 2/2003 | Civanlar et al. ............. 709/218 |
| 2003/0036882 A1 | 2/2003 | Harper et al. |
| 2003/0037328 A1 | 2/2003 | Cicciarelli et al. |
| 2003/0041136 A1 | 2/2003 | Cheline et al. ............... 709/223 |
| 2003/0046371 A1 | 3/2003 | Falkner |
| 2003/0051128 A1 | 3/2003 | Rodriguez et al. ............ 713/100 |
| 2003/0055878 A1 | 3/2003 | Fletcher et al. |
| 2003/0078960 A1 | 4/2003 | Murren et al. |
| 2003/0110188 A1 | 6/2003 | Howard et al. |
| 2003/0126242 A1 | 7/2003 | Chang ......................... 709/222 |
| 2003/0191730 A1 | 10/2003 | Adkins et al. |
| 2003/0204562 A1 | 10/2003 | Hwang |
| 2003/0233383 A1 | 12/2003 | Koskimies |
| 2003/0233493 A1 | 12/2003 | Boldon et al. |
| 2004/0010716 A1 | 1/2004 | Childress et al. |
| 2004/0068554 A1 | 4/2004 | Bales et al. |
| 2004/0073787 A1 | 4/2004 | Ban et al. |
| 2004/0093492 A1 | 5/2004 | Daude et al. .................. 713/156 |
| 2004/0104927 A1 | 6/2004 | Husain et al. |
| 2004/0107273 A1 | 6/2004 | Biran et al. |
| 2004/0123153 A1 | 6/2004 | Wright et al. ................ 713/201 |
| 2004/0148306 A1 | 7/2004 | Moulton et al. ............. 707/101 |
| 2004/0180721 A1 | 9/2004 | Rowe |
| 2004/0193876 A1 | 9/2004 | Donley et al. |
| 2004/0201604 A1 | 10/2004 | Kraenzel et al. ............. 345/700 |
| 2004/0236843 A1 | 11/2004 | Wing et al. ................... 709/219 |
| 2004/0243928 A1 | 12/2004 | Hesmer et al. |
| 2005/0027846 A1 | 2/2005 | Wolfe et al. |
| 2005/0033808 A1 | 2/2005 | Cheng et al. |
| 2005/0044197 A1 | 2/2005 | Lai |
| 2005/0044544 A1 | 2/2005 | Slivka et al. |
| 2005/0108297 A1 | 5/2005 | Rollin et al. |
| 2005/0108546 A1 | 5/2005 | Lehew et al. |
| 2005/0108593 A1 | 5/2005 | Purushothaman et al. |
| 2005/0144218 A1 | 6/2005 | Heintz ......................... 709/202 |
| 2005/0149729 A1 | 7/2005 | Zimmer et al. ............... 713/168 |
| 2005/0160289 A1 | 7/2005 | Shay |
| 2005/0193245 A1 | 9/2005 | Hayden et al. |
| 2005/0198196 A1 | 9/2005 | Bohn et al. |
| 2005/0216524 A1 | 9/2005 | Gomes et al. |
| 2005/0216902 A1 | 9/2005 | Schaefer |
| 2005/0226059 A1 | 10/2005 | Kavuri et al. |
| 2005/0256952 A1 | 11/2005 | Mouhanna et al. |
| 2005/0262503 A1 | 11/2005 | Kane |
| 2005/0268145 A1 | 12/2005 | Hufferd et al. |
| 2005/0273486 A1 | 12/2005 | Keith, Jr. ..................... 709/200 |
| 2005/0283606 A1 | 12/2005 | Williams ..................... 713/166 |
| 2006/0021040 A1 | 1/2006 | Boulanger et al. ............. 726/23 |
| 2006/0031377 A1 | 2/2006 | Ng et al. |
| 2006/0031407 A1 | 2/2006 | Dispensa et al. |
| 2006/0031529 A1 | 2/2006 | Keith, Jr. ..................... 709/227 |
| 2006/0041641 A1 | 2/2006 | Breiter et al. |
| 2006/0041759 A1 | 2/2006 | Kaliski, Jr. et al. |
| 2006/0047716 A1 | 3/2006 | Keith, Jr. ..................... 707/203 |
| 2006/0047946 A1 | 3/2006 | Keith, Jr. .......................... 713/2 |
| 2006/0074943 A1 | 4/2006 | Nakano et al. |
| 2006/0095705 A1 | 5/2006 | Wichelman et al. .......... 711/171 |
| 2006/0129459 A1 | 6/2006 | Mendelsohn |
| 2006/0143709 A1 | 6/2006 | Brooks et al. .................. 726/23 |
| 2006/0179061 A1 | 8/2006 | D'Souza et al. |
| 2006/0224544 A1 | 10/2006 | Keith, Jr. ........................ 706/60 |
| 2006/0224545 A1 | 10/2006 | Keith, Jr. ........................ 706/60 |
| 2006/0233310 A1 | 10/2006 | Adams, Jr. et al. |
| 2007/0078925 A1 | 4/2007 | Aidun et al. |
| 2007/0094269 A1 | 4/2007 | Mikesell et al. |
| 2007/0143374 A1 | 6/2007 | D'Souza et al. |
| 2007/0174658 A1 | 7/2007 | Takamoto et al. |
| 2007/0174690 A1 | 7/2007 | Kambara et al. |
| 2007/0185936 A1* | 8/2007 | Derk et al. .................... 707/204 |
| 2007/0233633 A1 | 10/2007 | Keith, Jr. ........................ 706/60 |
| 2007/0239905 A1 | 10/2007 | Banerjee et al. ............... 710/22 |
| 2007/0271290 A1 | 11/2007 | Keith, Jr. ..................... 707/101 |
| 2007/0271428 A1 | 11/2007 | Atluri |
| 2007/0274315 A1 | 11/2007 | Keith ........................... 370/392 |
| 2007/0276836 A1 | 11/2007 | Chatterjee et al. |
| 2008/0034019 A1 | 2/2008 | Cisler et al. |
| 2008/0034071 A1 | 2/2008 | Wilkinson et al. |
| 2008/0077622 A1 | 3/2008 | Keith ........................... 707/200 |
| 2008/0077630 A1 | 3/2008 | Keith ........................... 707/204 |
| 2008/0127294 A1 | 5/2008 | Keith ............................... 726/1 |
| 2008/0209142 A1 | 8/2008 | Obernuefemann |
| 2008/0216168 A1 | 9/2008 | Larson et al. |
| 2008/0294860 A1 | 11/2008 | Stakutis et al. |
| 2008/0313632 A1 | 12/2008 | Kumar et al. |
| 2009/0094362 A1 | 4/2009 | Huff |
| 2010/0050011 A1 | 2/2010 | Takamoto et al. |

OTHER PUBLICATIONS

IEEE100 The Authoritative Dictionary Of IEEE Standards Terms, Seventh Edition, Jan. 2003, 3 pages.

VMWARE, VMware Infrastructure Architecture Overview, Jun. 14, 2006, http:/www.vmware.com/resourse/techresources/, pp. 1-14.

VMWARE, Using VMware Infrastructure for Backup and Restore, Oct. 26, 2006, http:/www.vmware.com/resourse/techresources/, pp. 1-20.

IBM Corporation, AFS: "User Guide", First Edition, Version 3.6. Apr. 2000, pp. 112.

Shepler et al. "RFC 3530—Network File System (NFS) version 4 Protocol", Standards Track, Apr. 2003, pp. 278, http://tools.ieff.org/html/rfc3530#page-119.

Microsoft@ Computer Dictionary, Fifth Edition, 2002, 3 pages.

Yu et al., "Scalable network resource management for large scale Virtual Private Networks," Simulation Modeling Practice and Theory, 12 (2004) pp. 263-285.

Cisco PIX "Configuring an IPSec Tunnel Between a Cisco Secure PIX Firewall and a Checkpoint NG Firewall," May 12, 2006, document ID 23785.

Bandwidth Capping at Source http://www.24onlinebilling.com/download/whitepapers/Bandwidth%20Capping%20At%20Source.pdf pp. 1-9.

Random House Unabridged Dictionary, "device: meaning and definitions," 1997, Random House Inc., retrieved via "http://dictionary.infoplease.com/device".

http://www.backup.com.

http://www.swapdrive.com/sdbackup.asp.

http://www.macrovision.com/products/flexnet_installshield/installshield/overview/index.shtml, pp. 1-3.

http://macrovision.com/products/flexnet_installshield/installshield/index.shtml, pp. 1-2.

http:/ www.stealthbits.com/, pp. 1-2.

http://www.microsoft.com/technet/prodtechnol/windows2000serv/maintain/featusability/inmnwp.mspx, pp. 1-36.

http://en.wikipedia.org/wik/Expert_system, pp. 1-9.

http://www.pctools.com/registry-mechanic/, pp. 1-2.

Tridgell, A., "Efficient Algorithms for Sorting and Synchronization," Thesis, The Australian National University, Feb. 1999, 106 pages.

MacDonald., J.P., "File System Support for Delta Compression," University of California at Berkeley, Dept. of Electrical Engineering and Computer Sciences, May 19, 2000, 32 pages.

Definition of Plug-in (computing) from http:/en.wikipedia.org/wiki/Plug-in_(computing), printed Jun. 18, 2011, 1 page.

Microsoft Press, Microsoft® Computer Dictionary, Fifth Edition; May 1, 2002, p. 39.

Plug-in definition from Wikipedia, http://en.wikipedia.org/wiki/Plug-in_(computing) printed Nov. 6, 2011, 5 pages.

* cited by examiner

METHOD OF AND SYSTEM FOR ENHANCED DATA STORAGE

FIELD OF THE INVENTION

The present invention relates to the field of computing. More specifically, the present invention relates to the field of data backup.

BACKGROUND OF THE INVENTION

In information technology, backup refers to the copying of data so that these additional copies may be restored after a data loss event. Backups are useful primarily for two purposes: to restore a computer to an operational state following a disaster (called disaster recovery) and to restore small numbers of files after they have been accidentally deleted or corrupted. Backups differ from archives in the sense that archives are the primary copy of data and backups are a secondary copy of data. Backup systems differ from fault-tolerant systems in the sense that backup systems assume that a fault will cause a data loss event and fault-tolerant systems assume a fault will not. Backups are typically that last line of defense against data loss and consequently the least granular and the least convenient to use.

Since a backup system contains at least one copy of all data worth saving, the data storage requirements are considerable. Organizing this storage space and managing the backup process is a complicated undertaking.

Any backup strategy starts with a concept of a data repository. The backup data needs to be stored somehow and probably should be organized to a degree. It is able to be as simple as a sheet of paper with a list of all backup tapes and the dates they were written or a more sophisticated setup with a computerized index, catalog or relational database. Different repository models have different advantages. This is closely related to choosing a backup rotation scheme.

An unstructured repository may simply be a stack of floppy disks or CD-R media with minimal information about what was backed up and when. This is the easiest to implement, but probably the least likely to achieve a high level of recoverability.

A Full plus Incremental repository aims to make storing several copies of the source data more feasible. At first, a full backup (of all files) is taken. After that an incremental backup (of only the files that have changed since the previous full or incremental backup) is taken. Restoring whole systems to a certain point in time would require locating the full backup taken previous to that time and all the incremental backups taken between that full backup and the particular point in time to which the system is supposed to be restored. This model offers a high level of security that something is able to be restored and is able to be used with removable media such as tapes and optical disks. The downside is dealing with a long series of incrementals and the high storage requirements.

A Full plus Differential backup differs from a Full plus Incremental in that after the full backup is taken, each partial backup captures all files created or changed since the full backup, even though some may have been included in a previous partial backup. Its advantage is that a restore involves recovering only the last full backup and then overlaying it with the last differential backup.

A Mirror plus Reverse Incrementals repository is similar to a Full plus Incrementals repository. The difference is instead of an aging full backup followed by a series of incrementals, this model offers a mirror that reflects the system state as of the last backup and a history of reverse incrementals. One benefit of this is it only requires an initial full backup. Each incremental backup is immediately applied to the mirror and the files they replace are moved to a reverse incremental. This model is not suited to use removable media since every backup must be done in comparison to the mirror.

A continuous data protection model takes backup a step further, and instead of scheduling periodic backups, the system immediately logs every change on the host system. This is generally done by saving byte or block-level differences rather than file-level differences. It differs from simple disk mirroring in that it enables a roll-back of the log and thus restore of old image of data.

Deciding what to back up at any given time is a harder process than it seems. By backing up too much redundant data, the data repository will fill up too quickly. If enough data is not backed up, critical information is able to get lost. The key concept is to only back up files that have changed.

Copying the file system that holds the files to be backed up to another location is one option. This usually involves unmounting the file system and running a program like dump. This is also known as a raw partition backup. This type of backup has the possibility of running faster than a backup that simply copies files. A feature of some dump software is the ability to restore specific files from the dump image.

Some file systems have an archive bit for each file that says it was recently changed for copies of only changed files. Some backup software looks at the date of the file and compares it with the last backup, to determine whether the file was changed.

Block level incremental copying is a more sophisticated method of backing up changes to files by only backing up the blocks within the file that have changed. This requires a higher level of integration between the file system and the backup software.

A versioning file system keeps track of all changes to a file and makes those changes accessible to the user. Generally this gives access to any previous version, all the way back to the file's creation time. An example of this is Wayback for the Linux OS.

If a computer system is in use while it is being backed up, the possibility of files being open for reading or writing is real. If a file is open, the contents on disk may not correctly represent what the owner of the file intends. This is especially true for database files of all kinds.

When attempting to understand the logistics of backing up open files, one must consider that the backup process could take several minutes to back up a large file such as a database. In order to back up a file that is in use, it is vital that the entire backup represent a single-moment snapshot of the file, rather than a simple copy of a read-through. This represents a challenge when backing up a file that is constantly changing. Either the database file must be locked to prevent changes, or a method must be implemented to ensure that the original snapshot is preserved long enough to be copied, all while changes are being preserved. Backing up a file while it is being changed, in a manner that causes the first part of the backup to represent data before changes occur to be combined with later parts of the backup after the change results in a corrupted file that is unusable, as most large files contain internal references between their various parts that must remain consistent throughout the file.

A snapshot is an instantaneous function of some storage systems that presents a copy of the file system as if it was frozen in a specific point in time, often by copy-on-write mechanism. Quiescing to consistent state (e.g. closing all files) for a short time, taking a snapshot, then resuming data change process and running the backup on the snapshot is an effective way to work around this problem. A snapshot itself is hardly a backup, as it does not protect from disk hardware failure.

Many backup software packages feature the ability to backup open files. Some simply check for openness and try again later.

For cold database backup, during a cold backup the database is closed or locked and not available to users. All files of the database are copied (image copy). The data files do not change during the copy so the database is in sync upon restore.

Some database management systems offer a means to generate a backup image of the database while it is online and usable ("hot"). This usually includes an inconsistent image of the data files plus a log of changes made while the procedure is running. Upon a restore, the changes in the log files are reapplied to bring the database in sync.

Not all information stored on the computer is stored in files. Accurately recovering a complete system from scratch requires keeping track of this non-file data also. System specifications are needed to procure an exact replacement after a disaster. Each file's permissions, owner, group, ACLs, and any other metadata need to be backed up for a restore to properly recreate the original environment. The layout of the original disk, as well as partition tables and file system settings, is needed to properly recreate the original system. The boot sector is able to sometimes be recreated more easily than saving it. Still, it usually is not a normal file and the system will not boot without it.

It is frequently useful to manipulate the backed up data to optimize the backup process. These manipulations are able to improve backup speed, restore speed, data security, and media usage. Various schemes are able to be employed to shrink the size of the source data to be stored so that less storage space is used. Compression is frequently a built-in feature of tape drive hardware or other storage hardware.

When multiple similar systems are backed up to the same destination storage device, there exists the potential for much redundancy within the backed up data. For example, if 20 Windows® workstations were backed up to the same data repository, they might share a common set of system files. The data repository only needs to store one copy of those files to be able to restore any one of those workstations. This technique is able to be applied at the file level or even on raw blocks of data, potentially resulting in a massive reduction in required storage space.

Sometimes backup jobs are duplicated to a second set of storage media. This is able to be done to rearrange the backup images to optimize restore speed, to have a second copy for archiving in a different location or on a different storage medium.

High capacity removable storage media such as backup tapes present a data security risk if they are lost or stolen. Encrypting the data on these media is able to mitigate this problem, but presents new problems. First, encryption is a CPU intensive process that is able to slow down backup speeds. Second, once data has been encrypted, it is able to not be effectively compressed (although since redundant data makes cryptanalytic attacks easier many encryption routines compress the data as an integral part of the encryption process). Third, the security of the encrypted backups is only as effective as the security of the key management policy.

Sometimes backup jobs are copied to a staging disk before being copied to tape. This is able to be useful if there is a problem matching the speed of the final destination device with the source system as is frequently faced in network-based backup systems.

Many backup programs make use of checksums or hashes to validate that the data was accurately copied. These offer several advantages. First, they allow data integrity to be verified without reference to the original file: if the file as stored on the backup medium has the same checksum as the saved value, then it is very probably correct. Second, some backup programs are able to use checksums to avoid making redundant copies of files, to improve backup speed. This is particularly useful for the de-duplication process.

SUMMARY OF THE INVENTION

A method of and system for enhanced storage allows more data to be backed up than would otherwise be possible. Instead of storing uncompressed base images and incremental images, differentials of non-current base images are compressed and stored. Furthermore, incremental images that are older than the current base image are removed. By only saving differential base images that are compressed, aside from the newest base image, and deleting older incremental images, a significant amount of space is saved. A removable drive is used as temporary storage in the process of generating a compressed differential base for previous base images. Additionally, a process ensures that previous base images are differentials of the most recent base image and not each other.

In one aspect, a method of providing enhanced data storage comprises storing a set of compressed base images and an uncompressed base image on a main storage, writing a new base image to an additional storage, compressing the uncompressed base image based on the new base image and moving the new base image to the main storage. A set of incremental images are stored on the main storage. Compressing the uncompressed base image based on the new base image includes differential compression. The set of compressed base images are differentially compressed. The main storage and the additional storage are contained within a storage appliance. The additional storage is temporary storage. Additionally, the additional storage is a removable drive.

In another aspect, a method of synchronizing compressed base images with an uncompressed base image comprises storing an N−1 compressed base image on a temporary storage, wherein N is initially 0, decompressing a first N−2 compressed base image into an N−2 uncompressed base image using the N−1 compressed base image on the temporary storage, compressing the N−2 uncompressed base image into a second N−2 compressed base image using a current base image and replacing the first N−2 compressed base image with the second N−2 compressed base image. Compressed includes differentially compressed. The method further comprises repeating the steps while decreasing N each time until all of the compressed base images are based on the current base image. The method runs as a background process. The method automatically begins after the current base image is replaced by a new base image. The temporary storage is a removable drive.

In yet another aspect, a system for providing enhanced data storage comprises a computing device and a storage appliance coupled to the computing device, wherein the storage appliance further comprises a main storage component for storing a set of compressed base images and an uncompressed base image and a removable storage component coupled to the main storage component for temporarily storing base images. The main storage stores a set of incremental images. The removable storage component temporarily stores a new uncompressed base image while the uncompressed current base image is compressed using the new uncompressed base image. The removable storage component temporarily stores an N−1 compressed base image, while an N−2 compressed base image is decompressed and then the decompressed N−2 base image is re-compressed based on a current base image, wherein N starts at 0 and decreases until all of the compressed base images are based on the current base image. The storage appliance contains a backup application for initiating a backup sequence which includes storing a base image on the storage appliance. The storage appliance contains a background application for ensuring all of the compressed base images are based on the uncompressed base image. The computing device contains a backup application for initiating a backup sequence which includes storing a base image on the storage appliance. The computing device is selected from the group consisting of a personal computer, a server, a PDA, a laptop, a gaming console and a mobile phone.

In another aspect, an apparatus for providing enhanced data storage comprises a main storage component for storing a set of compressed base images and an uncompressed base image and a removable storage component coupled to the main storage component for temporarily storing base images. The main storage stores a set of incremental images. The removable storage component temporarily stores a new uncompressed base image while the uncompressed current base image is compressed using the new uncompressed base image. The removable storage component temporarily stores an N−1 compressed base image, while an N−2 compressed base image is decompressed and then the decompressed N−2 base image is re-compressed based on a current base image, wherein N starts at 0 and decreases until all of the compressed base images are based on the current base image. The storage appliance contains a backup application for initiating a backup sequence which includes storing a base image on the storage appliance. The storage appliance contains a background application for ensuring all of the compressed base images are based on the uncompressed base image.

In yet another aspect, a network of devices for providing enhanced data storage comprises a network, a plurality of computing devices for sending data to be backed up and a storage appliance coupled to the plurality of computing devices through the network, wherein the storage appliance backs up the data from the plurality of computing devices and further comprises a main storage component for storing a set of compressed base images and an uncompressed base image and a removable storage component coupled to the main storage component for temporarily storing base images. The main storage stores a set of incremental images. The removable storage component temporarily stores a new uncompressed base image while the uncompressed current base image is compressed using the new uncompressed base image. The removable storage component temporarily stores an N−1 compressed base image, while an N−2 compressed base image is decompressed and then the decompressed N−2 base image is re-compressed based on a current base image, wherein N starts at 0 and decreases until all of the compressed base images are based on the current base image. The storage appliance contains a backup application for initiating a backup sequence which includes storing a base image on the storage appliance. The storage appliance contains a background application for ensuring all of the compressed base images are based on the uncompressed base image. Each of the plurality of computing devices contains a backup application for initiating a backup sequence which includes storing a base image on the storage appliance. The plurality of computing devices are selected from the group consisting of personal computers, servers, PDAs, laptops, gaming consoles and mobile phones.

DETAILED DESCRIPTION OF THE PREFERRED EMBODIMENT

Figure 1:
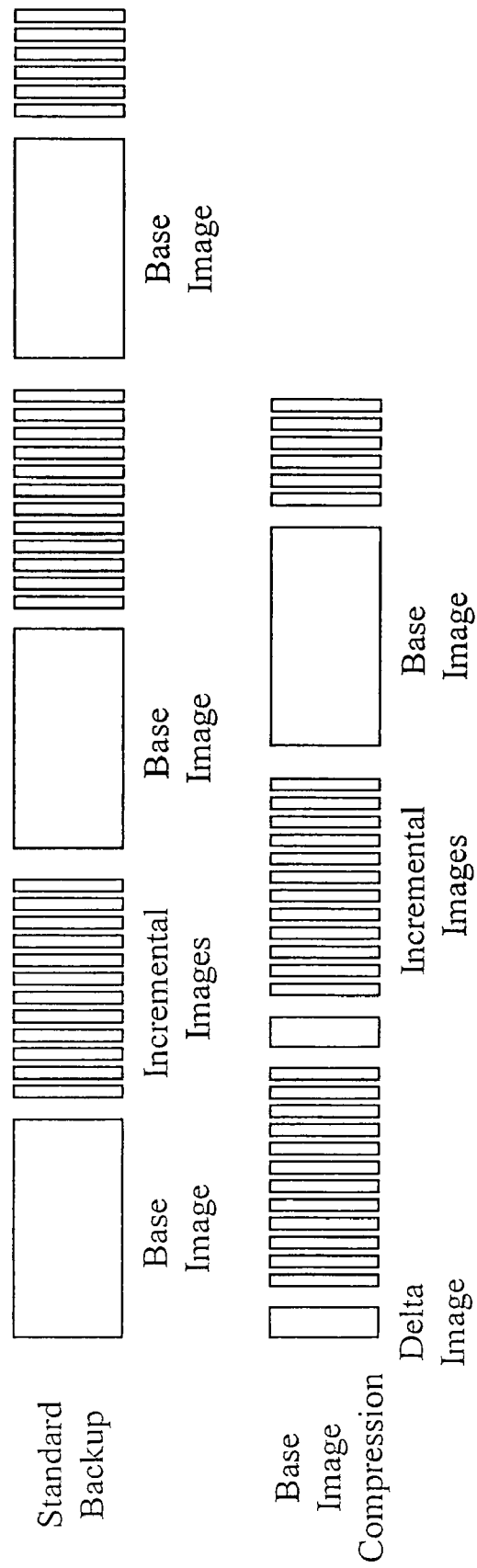
FIG. 1 illustrates an exemplary block diagram of relative storage reduction using base image compression.

A method of and system for enhanced data storage is described herein. A storage appliance has several functions, one of which includes storage of server and/or personal computer backup images. The backup function requires extensive amounts of storage since it is preferable to store multiple backups. The enhanced data storage is a storage methodology including compression techniques, enhancements to data purge routines and use of removable drives as extended temporary storage. These improvements greatly enlarge the storage capabilities of a storage appliance. For example, a storage appliance utilizing a standard backup methodology is capable of storing 200 to 300 GB of data based on a 50% compression ratio. However, utilizing the enhanced data storage, the backup storage capacity is able to be increased 2 to 3 times that of the standard methodology, thus potentially allowing nearly 1 TB of data to be stored.

The storage appliance stores image backups on RAID storage drives, preferably. To protect a customer's data, the storage appliance is able to retain multiple backup periods of data. Each server's backup is stored as a base image, and then incremental backups are generated and stored. These incremental backups are much smaller since they are differential images, storing only differences compared to the base image. These incremental backups are taken as often as desired to provide a necessary level of protection.

The methods implemented to maximize the storage of the storage appliance include storage of base image files as differentials, similar to the backup incrementals, extending purge algorithms to allow an administrator to purge differentials and using additional storage such as a removable drive as a temporary storage drive to hold uncompressed data before and after compression.

Base image files stored by image backup technologies are designed to support differential compression, even though image files are compressed by backup software. This provides an opportunity to store multiple copies of base backup images with additional generations of image files to be compressed to about the size of daily differential snapshot files.

To compress the image files further, which are already compressed, requires a compression technique where only the differences of two files are stored for each generation. For example, if a first image file and a second image file are the same, except that the second image file also contains data X, then data X is all that is stored for the second image file. Then, later, by using a difference, or delta method, the original uncompressed file is able to be reconstructed by applying the differential file to the source file.

The efficiency of this compression algorithm depends on each base image being similar to each new generation. In almost all server and personal computer images, this is the case. The operating systems, applications, and most of the data do not change from month to month, so this repeated data does not have to be replicated.

FIG. 1 illustrates an exemplary block diagram of relative storage reduction using base image compression. Although not drawn to scale, with the same amount of base images and sets of incremental images, clearly the base image compression methodology utilizes less storage space than the standard backup scheme. As described above, since the base images are compressed (aside from the most current base image) and only delta images are stored, the base image compression methodology saves a significant amount of storage space.

An issue with base image compression storage is that the retrieval of prior generations requires decompression, which is slower than direct access. However, since the current base image is not compressed, which is the most likely accessed image, this issue is not very significant.

Another issue with base image compression is that prior base image generations are based on the next and newer generation. Therefore, to retrieve data from several generations back would require decompressing each successive generation. This issue is resolved by generating a background process which expands prior generations and recompresses these images based on the latest uncompressed base image. This would make access to prior images require only a single decompression.

When loading new base images onto main system drives of a storage appliance, there is a need for temporary additional storage. Since a prior image becomes compressed, the storage where the uncompressed image was stored would be wasted on the main storage drive. In cases where a base image file requires a large percentage of the available drive, resolving this issue would greatly extend the storage capacity.

This issue is alleviated by writing initial backups to an additional storage such as a removable drive initially, and then compressing the prior image before moving the new base image onto the main system drives.

Since incremental backups are kept in the current backup period for business protection, but prior incremental backups are only retained to allow for recovery of single user files, such as accidentally deleted files; allowing users to purge periodic incremental backups would also greatly extend the storage capacity of the whole system.

Figure 2:
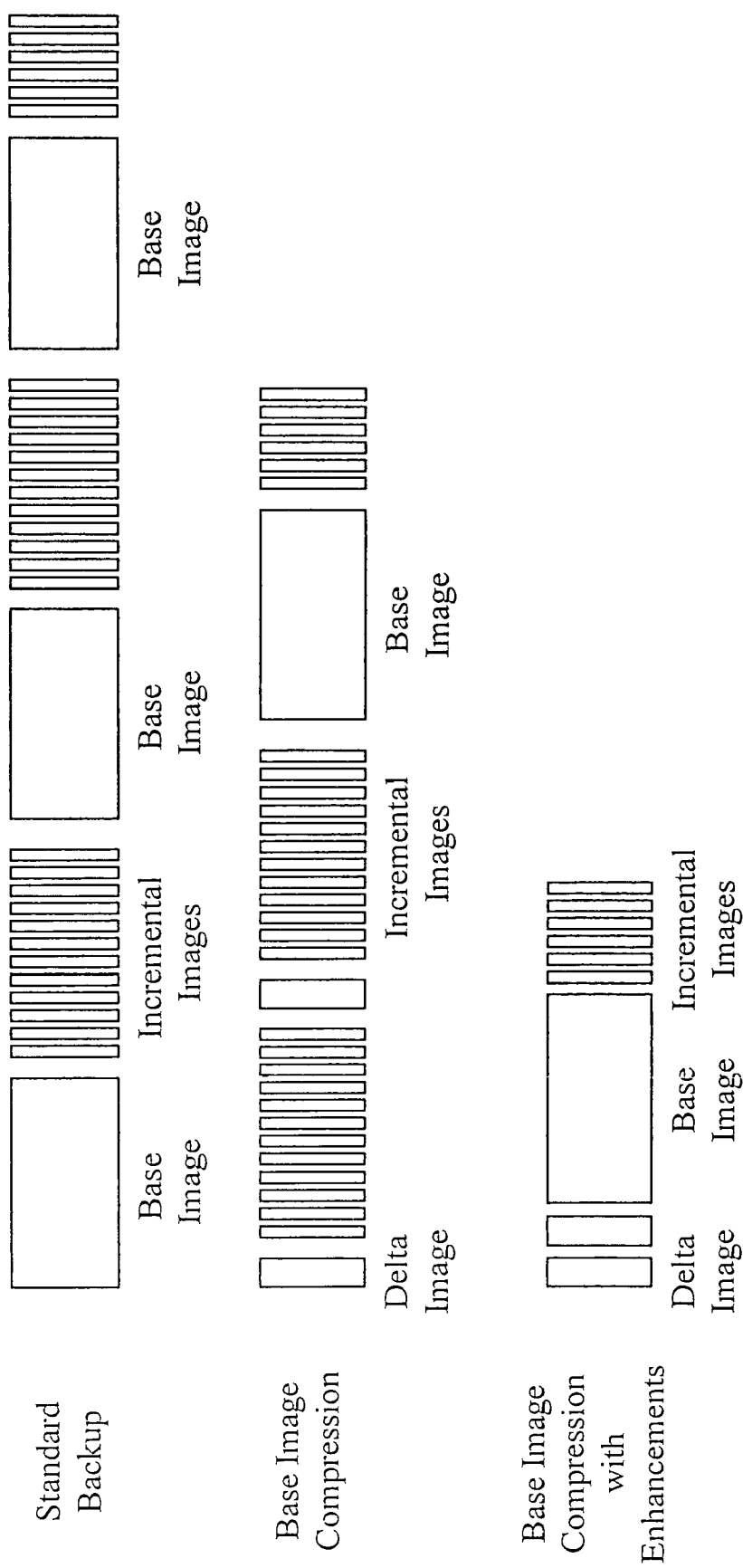
FIG. 2 illustrates an exemplary block diagram of relative storage reduction using base image compression with enhancements.

FIG. 2 illustrates an exemplary block diagram of relative storage reduction using base image compression with enhancements. Although not drawn to scale, with the same amount of base images and sets of incremental images, clearly the base image compression methodology utilizes less storage space than the standard backup scheme. Furthermore, by implementing an enhanced purge routine, even more storage space is saved.

An administrator is given the capability of selecting retention periods for locally storing incremental files. The overall storage gain shown in the FIG. 2 is over three times.

Using the removable drive for temporary storage also gains the ability to store backup images of servers where a single backup image is very large, which is typical of large Exchange databases or on file servers.

Figure 3:
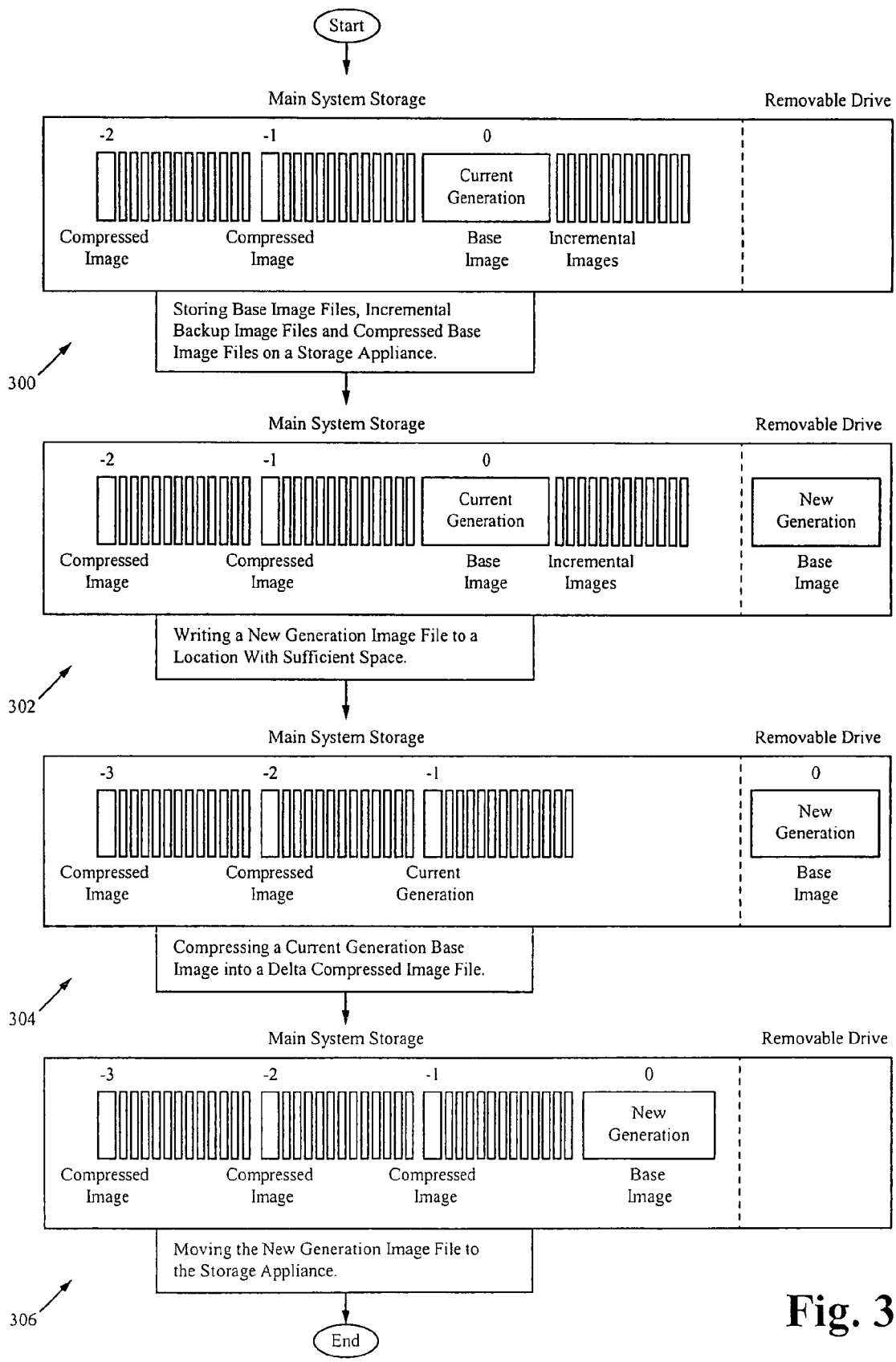
FIG. 3 illustrates a graphical and textual flowchart of a process of adding a new image to a storage appliance and then compressing a prior base image using the new image as the compression base.

FIG. 3 illustrates a graphical and textual flowchart of a process of adding a new image to a storage appliance and then compressing a prior base image using the new image as the compression base. In the step 300, a system (e.g. a storage appliance) stores a base image file, incremental images and compressed base image files. The compressed base image files are compressed using a file comparison algorithm which then stores the differences only. A decompression algorithm uses the base image file and applies the differences to generate a complete image file when it is time to decompress a compressed base image file. In the step 302, backup software writes a new image file to a removable drive where there is ample space. The new image file is able to be written anywhere there is sufficient temporary storage available. In the step 304, a current generation image is compressed into a delta (differences) compressed image file. The current generation image is compressed by comparing the current generation image with the new generation image and determining the differences. In the step 306, the new generation file is removed from the removable drive, either by copy and deletion or by movement to the storage appliance.

When image files are compressed using the method above, the prior generations are compressed using a prior (and compressed) image. To decompress these files requires decompressing the source file, then decompressing the file image. Prior generations going back would be compressed using the next newer image. Decompressing images several generations back are able to become an inordinately long process. Therefore, a solution to this is a background process which is able to run and bring prior generations up to date by re-compressing images using the latest generation base image.

Figure 4:
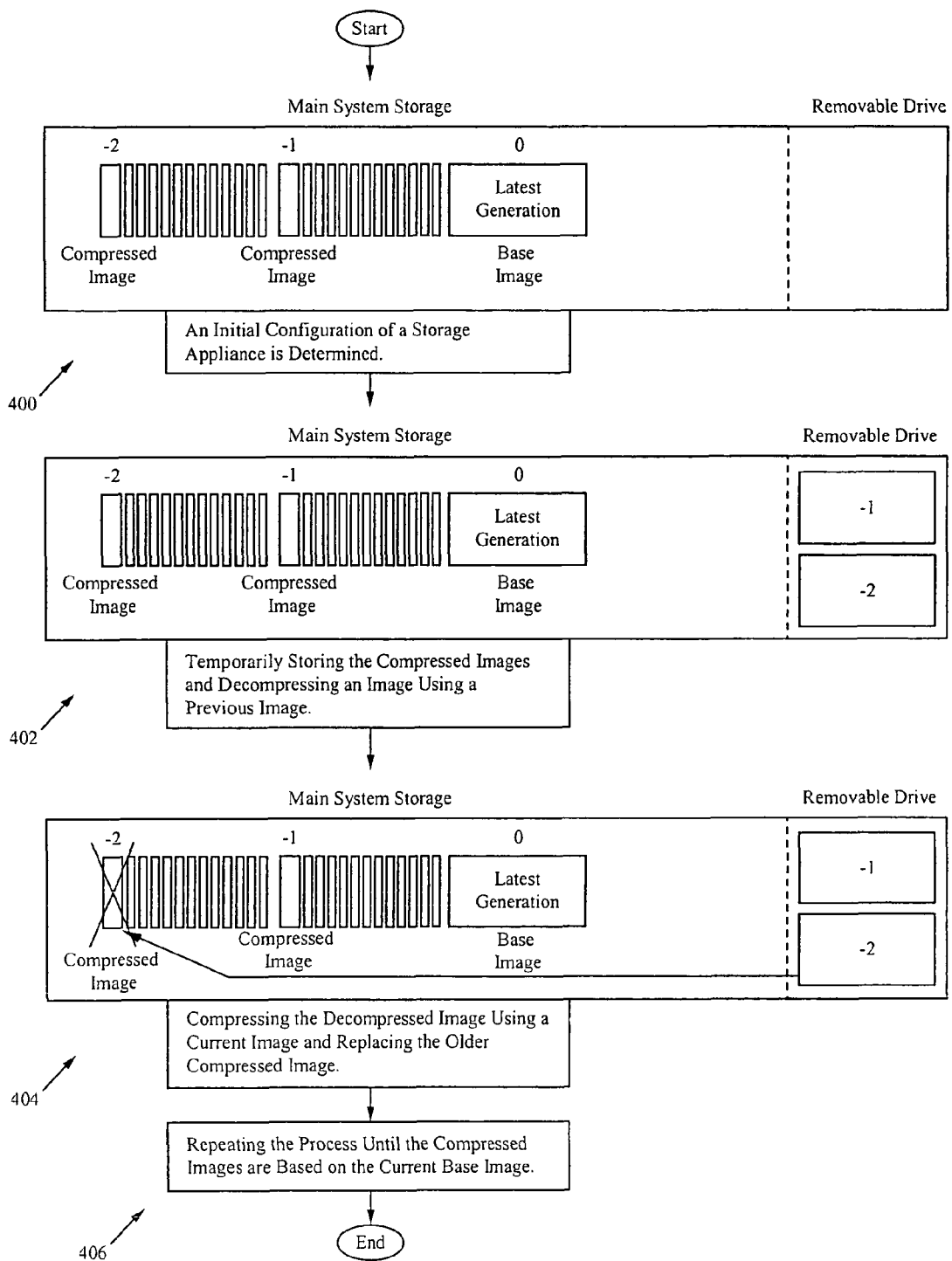
FIG. 4 illustrates a flowchart of a process of synchronizing images with a current image.

FIG. 4 illustrates a flowchart of a process of synchronizing images with a current image. The problem is that when a base image is initially loaded, and the prior base image is compressed as a (−1) generation, a (−2) generation is still compressed via the (−1) generation which means two steps of decompression would be required to decompress the (−2) generation. In the step 400, an initial configuration of a storage appliance is determined. For example, it is determined that the configuration contains 2 compressed images, sets of incremental images and a current image. If the initial configuration is already known, then the step 400 is able to be skipped. In the step 402, the (−1) image is stored temporarily. Preferably, the (−1) image is temporarily stored in a removable drive; however, any storage location is possible. The (−2) image is then decompressed in the temporary storage using the (−1) image. Large image files are split into smaller pieces, so this step is able to be iterative if necessary. In some embodiments, storing the (−1) image and decompressing are two separate steps. In the step 404, the decompressed (−2) version is then compressed using the (0) current image file and then replaces the older (−2) file. In some embodiments, compressing the decompressed version and replacing the file are two separate steps. In the step 406, the process repeats for each of the prior versions, if any, (e.g. (−3), (−4)). Preferably, this process automatically begins after a new base image replaces a current base image.

Figure 5A:
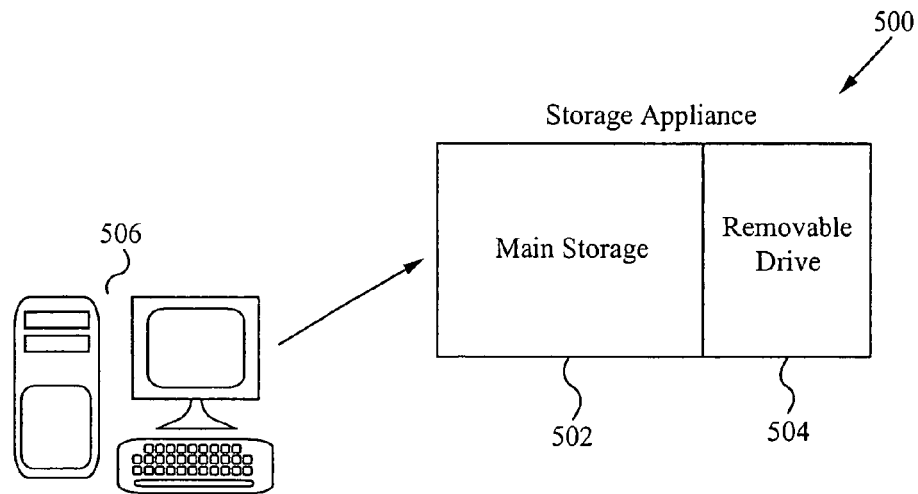
FIG. 5A illustrates a graphical representation of a computing device coupled to a storage appliance.

FIG. 5A illustrates a graphical representation of a computing device coupled to a storage appliance. A storage appliance 500 is coupled to a computing device 506. The storage appliance 500 implements and enables the above-described methodology of storing backup data more efficiently. The storage appliance 500 includes a main storage 502 and removable drive 504 which are utilized in the backup process as described above. In some embodiments, additional storage instead of a removable drive is included.

The computing device 506 couples to the storage appliance 500 directly or through a network. In some embodiments, the coupling is wired, and in some embodiments, the coupling is wireless. The computing device 506 is able to be a personal computer, a server, a PDA, a laptop, a gaming console, a mobile phone or any other computing device that needs data backed up.

Figure 5B:
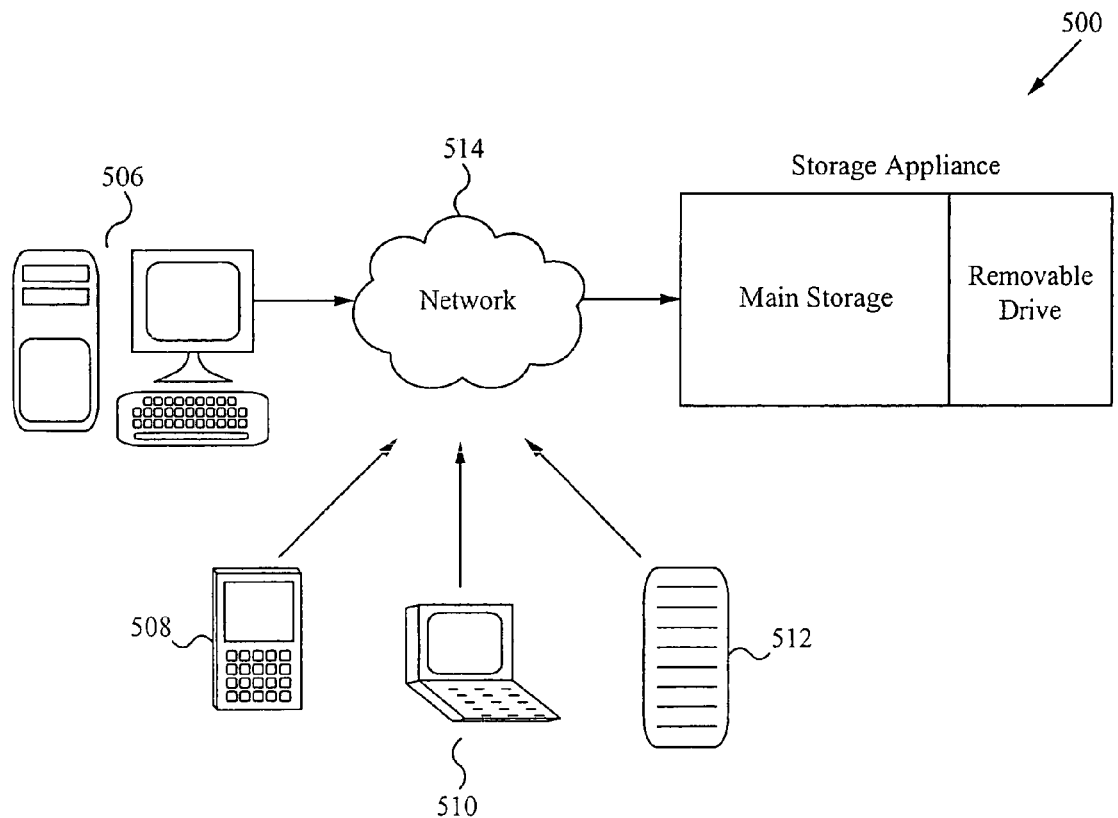
FIG. 5B illustrates a graphical representation of a network of devices coupled to a storage appliance.

FIG. 5B illustrates a graphical representation of a network of devices coupled to a storage appliance. A storage appliance 500 is coupled to a set of computing devices 506, 508, 510, 512. The storage appliance 500 implements and enables the above-described methodology of storing backup data more efficiently. The storage appliance 500 includes a main storage 502 and removable drive 504 which are utilized in the backup process as described above. In some embodiments, additional storage instead of a removable drive is included.

The computing devices 506, 508, 510, 512 couple to the storage appliance 500 through a network 514. In some embodiments, the coupling is wired, and in some embodiments, the coupling is wireless. The computing devices 506, 508, 510, 512 are able to be a personal computer, a server, a PDA, a laptop, a gaming console, a mobile phone or any other computing device that needs data backed up.

Since backing up a network of devices is slightly more complicated than backing up a single device, additional steps are taken to ensure full and proper back up of each device. For example, if all of the computing devices attempt to back up their data at the same time, a temporary storage such as a removable drive may not have sufficient capacity to handle the backups all at once. Therefore, scheduling is able to be provided to ensure each computing device is backed up at a specified time. Furthermore, since each computing device will have a different base image as well as different incremental images, the images are separated to avoid any data corruption. In some embodiments, the main storage on the storage appliance is partitioned so that each computing device has its own partition for backup. In other embodiments, other steps are taken to avoid data corruption. Also, in some embodiments, additional storage appliances are utilized to back up the data.

Figure 6:
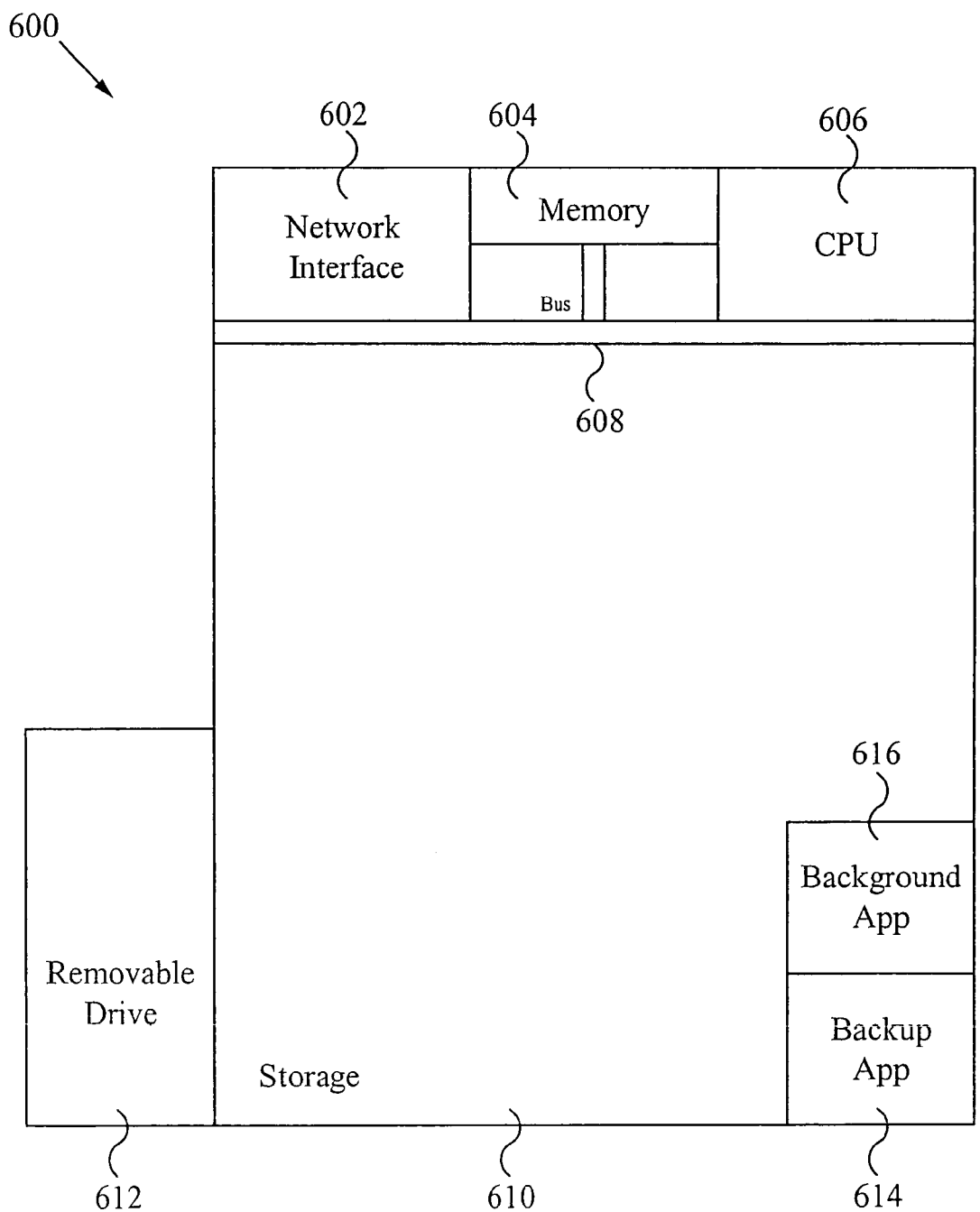
FIG. 6 illustrates a block diagram of a storage appliance.

FIG. 6 illustrates a block diagram of a storage appliance. A storage appliance 600 contains standard server components including a network interface 602, a memory 604, a central processing unit 606, a system bus 608 and storage 610 in addition to other standard computing components. Furthermore, the storage appliance 600 is able to have multiple of each of these components. The storage 610 is able to be any storage implementation such as a hard disk drive, RAID, or another form of storage. The storage appliance also includes one or more removable drives 612 or another form of additional storage. A backup application 614 implements the above-described methodology of more efficiently storing backed up data. A background application 616 is the process that runs in the background to keep the differential images up-to-date based on the most recent image. Furthermore, additional applications are included within the storage appliance 600 to implement the improved storage methodology such as a user interface to allow users to purge data that no longer needs to be backed up.

To utilize the enhanced data storage, one or more computing devices are coupled to a storage appliance. Periodically, the data on the one or more computing devices is backed up onto the storage appliance as an image. Initially, a first base image is not compressed so that it is able to be retrieved relatively quickly if necessary. However, subsequent backups mean that multiple base images are backed up on the storage appliance. To minimize the total size of the backups, when a new image is backed up, the current base image is modified to only store a differential image based on the new base image. Therefore, the only full uncompressed image is the new base image. Additional storage such as a removable drive is used to perform the differential compression. This saves a significant amount of space in the main storage. Furthermore, a purge operation is permitted where users and/or administrators purge incremental data when it no longer needs to be backed up, thus saving more space. Additionally, to make the retrieval of data more efficient, instead of keeping each differential base image based on each prior image, a background operation decompresses and recompresses each differential base image based on the most recent base image. The backup, differential compression, purging and background processes are able to function with or without user intervention.

In operation, the enhanced data storage not only stores a most recent image of a computing device, but also previous images in addition to incremental images. Therefore, to store all of these backups, a significant amount of storage would normally be required, but with the enhanced data storage, storage space is saved utilizing differentials, compression and purging.

For example, a server is coupled to a storage appliance implementing the enhanced data storage methodology. An administrator configures the storage appliance to save images of the server on a monthly basis in addition to storing incremental images more often. After a month passes, a first base image is backed up on a main storage of the storage appliance. Incremental images are copied to the storage appliance in the subsequent days. After a second month passes, a second base image is backed up. The second base image is first stored on a removable drive. The first base image is then compared with the second base image, and only a differential of the first base image is stored and compressed. The uncompressed first base image is deleted. The second base image is then moved to the main storage and is deleted from the removable drive. Additional incremental images are copied again in subsequent days. Incremental images stored before the current base image are purged as desired. After a third month passes, the process occurs again of modifying the current base image (e.g. the second base image) to a differential base image and then storing the full new base image (e.g. the third base image). At some point, particularly when the storage appliance has free resources, a background application decompresses the first differential base image and recompresses it based on the newest base image (e.g. the third base image). The processes continue to repeat as time passes such that previous base images are differentials and are compressed while the newest base image is full and uncompressed. Furthermore, the previous base images are continuously uncompressed and recompressed differentials of the newest base image instead of each other.

In some embodiments, the storage appliance is very basic storage, and the applications are stored on another device such as a server where the applications control the storage appliance remotely. This allows the storage appliance to be a very inexpensive "dumb" machine yet perform complex storage tasks. For instance, applications to make a backup are able to be on the server in addition to the applications to differentially compress as well as decompress and recompress the base images.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of synchronizing compressed base images with an uncompressed base image, comprising:
   a. storing an N−1 compressed base image on a temporary storage, wherein N is initially 0;
   b. decompressing a first N−2 compressed base image into an N−2 uncompressed base image using the N−1 compressed base image on the temporary storage;
   c. compressing the N−2 uncompressed base image into a second N−2 compressed base image using a current base image; and
   d. replacing the first N−2 compressed base image with the second N−2 compressed base image.

2. The method as claimed in claim 1 wherein compressed includes differentially compressed.

3. The method as claimed in claim 1 further comprising repeating a-d while decreasing N each time until all of the compressed base images are based on the current base image.

4. The method as claimed in claim 1 wherein the method runs as a background process.

5. The method as claimed in claim 1 wherein the method automatically begins after the current base image is replaced by a new base image.

6. The method as claimed in claim 1 wherein the temporary storage is a removable drive.

7. A system for providing enhanced data storage, comprising:
   a. a computing device; and
   b. a storage appliance coupled to the computing device, wherein the storage appliance further comprises:
      i. a main storage component for storing a set of compressed base images and an uncompressed base image; and
      ii. a removable storage component coupled to the main storage component for temporarily storing base images;
   wherein the removable storage component temporarily stores an N−1 compressed base image, while an N−2 compressed base image is decompressed and then the decompressed N−2 base image is re-compressed based on a current base image, wherein N starts at 0 and decreases until all of the compressed base images are based on the current base image.

8. The system as claimed in claim 7 wherein the main storage stores a set of incremental images.

9. The system as claimed in claim 7 wherein the removable storage component temporarily stores a new uncompressed base image while the uncompressed current base image is compressed using the new uncompressed base image.

10. The system as claimed in claim 7 wherein the storage appliance contains a backup application for initiating a backup sequence which includes storing a base image on the storage appliance.

11. The system as claimed in claim 7 wherein the storage appliance contains a background application for ensuring all of the compressed base images are based on the uncompressed base image.

12. The system as claimed in claim 7 wherein the computing device contains a backup application for initiating a backup sequence which includes storing a base image on the storage appliance.

13. The system as claimed in claim 7 wherein the computing device is selected from the group consisting of a personal computer, a server, a PDA, a laptop, a gaming console and a mobile phone.

14. An apparatus for providing enhanced data storage, comprising:
   a. a main storage component for storing a set of compressed base images and an uncompressed base image; and
   b. a removable storage component coupled to the main storage component for temporarily storing base images;
   wherein the removable storage component temporarily stores an N−1 compressed base image, while an N−2 compressed base image is decompressed and then the decompressed N−2 base image is re-compressed based on a current base image, wherein N starts at 0 and decreases until all of the compressed base images are based on the current base image.

15. The apparatus as claimed in claim 14 wherein the main storage stores a set of incremental images.

16. The apparatus as claimed in claim 14 wherein the removable storage component temporarily stores a new uncompressed base image while the uncompressed current base image is compressed using the new uncompressed base image.

17. The apparatus as claimed in claim 14 wherein the storage appliance contains a backup application for initiating a backup sequence which includes storing a base image on the storage appliance.

18. The apparatus as claimed in claim 14 wherein the storage appliance contains a background application for ensuring all of the compressed base images are based on the uncompressed base image.

19. A network of devices for providing enhanced data storage, comprising:
   a. a network;
   b. a plurality of computing devices for sending data to be backed up; and
   c. a storage appliance coupled to the plurality of computing devices through the network, wherein the storage appliance backs up the data from the plurality of computing devices and further comprises:
      i. a main storage component for storing a set of compressed base images and an uncompressed base image; and
      ii. a removable storage component coupled to the main storage component for temporarily storing base images;
   wherein the removable storage component temporarily stores an N−1 compressed base image, while an N−2 compressed base image is decompressed and then the decompressed N−2 base image is re-compressed based on a current base image, wherein N starts at 0 and decreases until all of the compressed base images are based on the current base image.

20. The network of devices as claimed in claim 19 wherein the main storage stores a set of incremental images.

21. The network of devices as claimed in claim 19 wherein the removable storage component temporarily stores a new uncompressed base image while the uncompressed current base image is compressed using the new uncompressed base image.

22. The network of devices as claimed in claim 19 wherein the storage appliance contains a backup application for initiating a backup sequence which includes storing a base image on the storage appliance.

23. The network of devices as claimed in claim 19 wherein the storage appliance contains a background application for ensuring all of the compressed base images are based on the uncompressed base image.

24. The network of devices as claimed in claim 19 wherein each of the plurality of computing devices contains a backup application for initiating a backup sequence which includes storing a base image on the storage appliance.

25. The network of devices as claimed in claim 19 wherein the plurality of computing devices are selected from the group consisting of personal computers, servers, PDAs, laptops, gaming consoles and mobile phones.

* * * * *